United States Patent [19]

Pospisil

[11] Patent Number: 5,546,827

[45] Date of Patent: Aug. 20, 1996

[54] CORE ELEMENT WIPER SUSPENDED BOOT

[75] Inventor: Joseph Pospisil, Royal Oak, Mich.

[73] Assignee: Teleflex Incorporated, Plymouth Meeting, Pa.

[21] Appl. No.: 500,483

[22] Filed: Jul. 10, 1995

[51] Int. Cl.⁶ ........................................ F16C 1/10
[52] U.S. Cl. .................... 74/502.4; 74/502; 74/502.6
[58] Field of Search ............... 74/18–18.2, 501.5 R–502

[56] References Cited

U.S. PATENT DOCUMENTS

| | | |
|---|---|---|
| 3,985,041 | 10/1976 | Gilmore . |
| 4,173,157 | 11/1979 | Miller et al. . |
| 4,304,149 | 12/1981 | Heimann . |
| 4,688,445 | 8/1987 | Spease et al. . |
| 4,967,609 | 11/1990 | Takagi et al. ................................. 74/18 |
| 5,009,122 | 4/1991 | Chaczyk et al. ........................ 74/502.6 |
| 5,211,071 | 5/1993 | Hedstrom ............................ 74/501.5 R |
| 5,235,870 | 8/1993 | Hedstrom ............................ 74/501.5 R |
| 5,383,377 | 1/1995 | Boike ........................................ 74/502 |
| 5,448,926 | 9/1995 | Reasoner ................................. 74/500.5 |

FOREIGN PATENT DOCUMENTS

| | | | |
|---|---|---|---|
| 397008A | 4/1990 | European Pat. Off. . | |
| 2-261916 | 10/1990 | Japan ..................... | 74/502 |
| 5-272523 | 10/1993 | Japan ..................... | 74/502.6 |
| 2206663 | 1/1989 | United Kingdom ............. | 74/501.5 R |

Primary Examiner—Vinh T. Luong
Attorney, Agent, or Firm—Howard & Howard

[57] ABSTRACT

A motion-transmitting remote control assembly including a conduit (14) movably supporting a flexible core element (10) with support fittings (16 and 18) disposed at each end of the conduit (14). A wiper cap (26) is supported for swivelling movement on a ball (24). The assembly is distinguished by a wiper-retainer (40) disposed about the core element (10) and a boot (42) having its ends (44 and 46) in tight gripping engagement with the wipers (26 and 40). In other words, a boot (42) extending between and supported by two core element wipers.

9 Claims, 2 Drawing Sheets

CORE ELEMENT WIPER SUSPENDED BOOT

TECHNICAL FIELD

This invention relates to a motion-transmitting remote control assembly of the type for transmitting motion in a curved path by a flexible core element movably supported in a conduit.

BACKGROUND ART

Components are known for keeping foreign matter out of the interior of the conduit in motion transmitting remote control assemblies of this type wherein the core element moves relative to and is in bearing engagement with the conduit. Such foreign matter could cause excessive wear and/or impede the movement of the core element. One of these components is a wiper cap attached to the end of the conduit and including a nose portion in close sliding engagement with the core element. The U.S. Pat. Nos. 4,173,157; 4,304,149 and 4,688,445 disclose examples of such wiper caps. An alternative component is a boot which expands and contracts axially with movement of the core element, as disclosed in U.S. Pat. No. 3,985,041. European Patent Application no. 90108243.8, having publication no. 0 397 008, discloses a remote control assembly utilizing both a wiper cap and a boot but independently of one another.

SUMMARY OF THE INVENTION

A motion transmitting remote-control assembly of the type for transmitting motion along a curved path by a flexible motion-transmitting core element including a conduit means extending between first and second ends with a swivel ball supported at the first end of the conduit means. A flexible motion-transmitting core element is movably supported by the conduit means and extending from the swivel ball at the first end thereof. A wiper cap is mounted on the swivel ball for swivelling movement about the center of the swivel ball and includes a wiper portion in close sliding engagement with the core element. The invention is characterized by including wiper-retainer means in close sliding engagement with the core element and is spaced axially along the core element from the wiper cap. A boot extends between a first end supported on the wiper cap and a second end supported on the wiper-retainer means. The boot is flexible and axially extendable and contractible.

BRIEF DESCRIPTION OF THE DRAWINGS

Other advantages of the present invention will become readily appreciated as the same becomes better understood by reference to the following detailed description when considered in connection with the accompanying drawings wherein.

DETAILED DESCRIPTION OF PREFERRED EMBODIMENT

Figure 1:
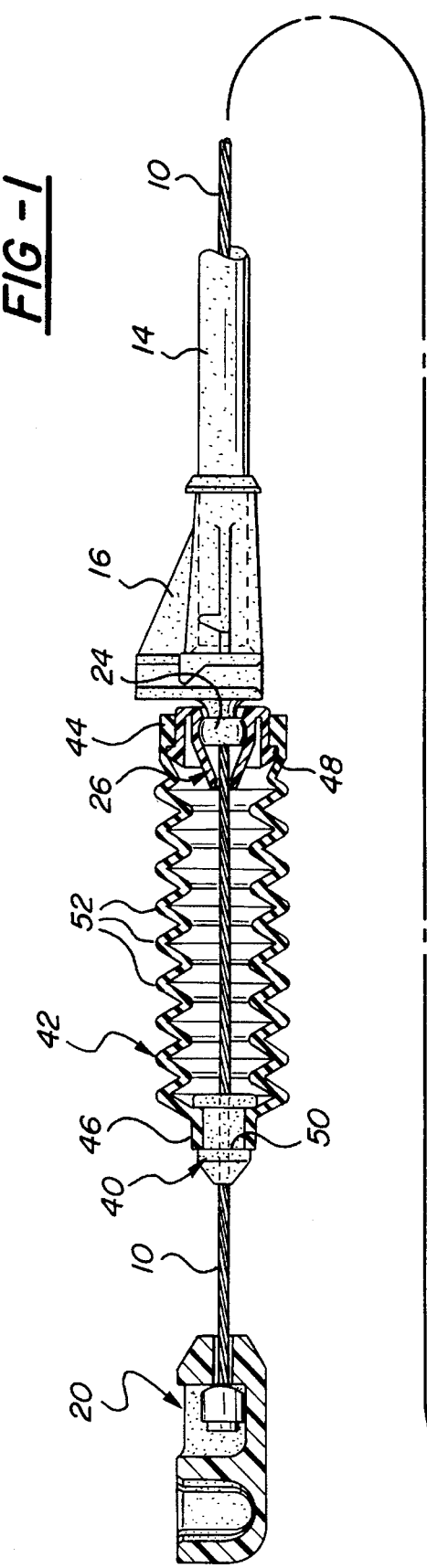
FIG. 1 is a side elevational view, partially in cross section, showing a remote control assembly utilizing the subject invention.
Figure 1:
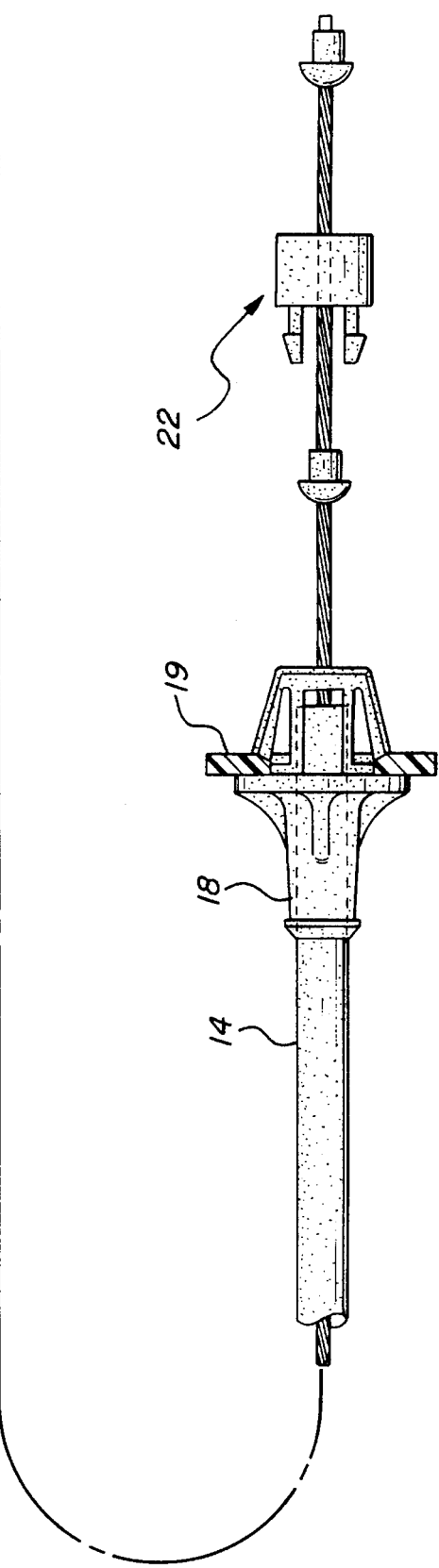
Figure 2:
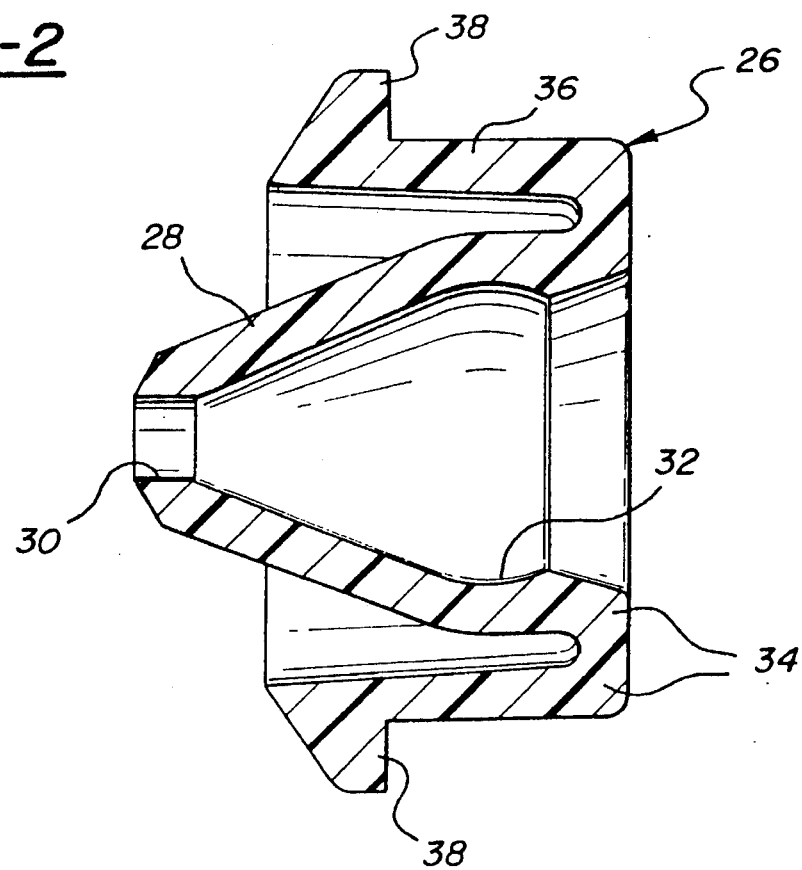
FIG. 2 is an enlarged cross sectional view of the wiper cap shown in the same cross section as shown in FIG. 1 and taken along line 2—2 of FIG. 3 which is the diameter of the wiper cap.
Figure 3:
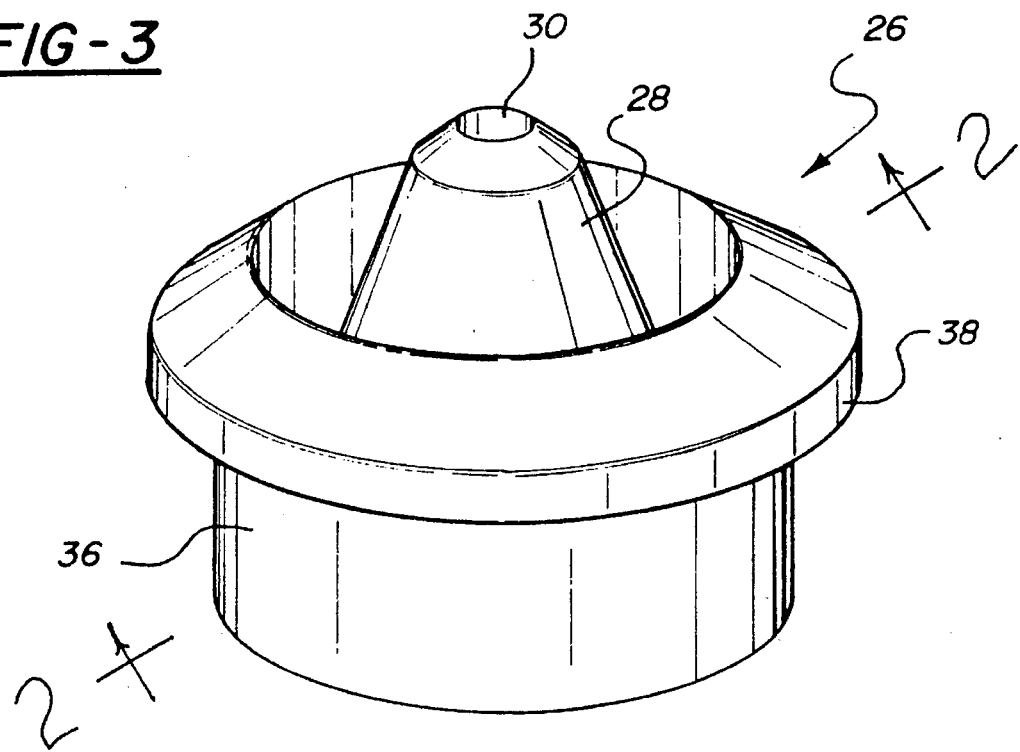
FIG. 3 is a perspective view of the wiper cap of FIG. 2.

A motion transmitting remote-control assembly of the type for transmitting motion along a curved path is generally shown in FIG. 1. The assembly includes a flexible motion-transmitting core element 10 movably supported in a conduit means, which, in turn, extends between first and second ends. The core element 10 consists of wire filaments wound together on a long lead or may be a single wire-like element.

The conduit means comprises a flexible conduit 14 and at least one support fitting disposed at each end thereof for attachment to a support structure, such as a bulkhead in an automobile. The conduit 14 typically comprises an inner plastic tube surrounded by a plurality of long lay wires or filaments disposed on a long lead helical angle with an outer tubular member extruded about the long lay wires. The support fittings 16 and 18 are rigid plastic with means well known in the art for attachment to a support structure, such as a bulkhead 19 in an automobile.

The core element extends from the first and second support fittings 16 and 18 at opposite ends of the conduit 14 and terminal means 20 and 22 are disposed at the ends of the core element 10 for attachment to control member.

A swivel ball 24 is defined by one of the support fittings 16 so as to be supported at the first end of the conduit means. The flexible motion-transmitting core element 14 extends from the swivel ball 24 at the first end of the conduit means. A wiper cap 26 is mounted on the swivel ball 24 for swivelling movement about the center of the swivel ball 24. The wiper cap includes a conically shaped wiper portion 28 having a nose with a bore 30 in close sliding engagement with the core element 10. The wiper cap 26 is an integral member made of plastic with the conical nose 28 flaring outwardly from the bore 30 of the nose adjacent the core element 14, through a spherical swivel pocket 32 surrounding the ball 24, and therealong through a reverse turn 34 to define a flange 36. The flange 36 extends annularly like a rim around the swivel ball 24 to a free or distal end. The flange 36 includes a projection 38 extending radially outwardly at the distal end of the flange 36.

The assembly is characterized by including wiper-retainer means 40 in close sliding engagement with the core element 14 and spaced axially along the core element 14 from the wiper cap 26, and a boot 42 extending between a first end 44 supported on the wiper cap 26 and a second end 46 supported on the wiper-retainer means 40. The boot 42 is flexible and extendable and contractible axially along the core element 10. The first end 44 of the boot 42 defines a first band and a shoulder 48 with the band being disposed about the flange 36 with the shoulder 48 being hooked over the projection 38 to retain the first end 44 of the boot on the wiper cap 26.

In a similar fashion the wiper-retainer 40 includes an annular recess 50 and the second end 46 of the boot 42 includes a second band disposed in the recess 50. The bands of the boot 42 are radially elastic for disposition about and tight engagement with the wiper cap 26 and the wiper-retainer 40, respectively. The bands at the respective ends 44 and 46 of the boot 42 are, therefore, in radially inwardly gripping engagement with the flange 36 and recess 50, respectively. In other words the boot 42 is sealed to the wiper 26 and wiper-retainer 40 at the respective ends thereof to prevent moisture and dirt, or other foreign matter, from entering the assembly. The boot 42 includes bellows-like corrugations for axial expansion and contraction. The boot 42 is also made of a different material than said wiper cap, although both are preferably made of plastic, the boot 42 is usually soft and pliable whereas the wipers 26 and 40 are hard for long wear.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A motion transmitting remote-control assembly comprising:

a conduit means (14, 16, 18) extending between first and second ends;

a swivel ball (24) supported at said first end of said conduit means;

a flexible motion-transmitting core element (10) movably supported by said conduit means and extending from said swivel ball (24) at said first end thereof;

a wiper cap (26) mounted on said swivel ball (24) for swivelling movement about the center of said swivel ball (24) and including a wiper portion (28) in close sliding engagement with said core element (10);

wiper-retainer means (40) in close sliding engagement with said core element (10) and spaced axially along said core element (10) from said wiper cap (26), and a boot (42) extending between a first end (44) supported on said wiper cap (26) and a second end (46) supported on said wiper-retainer means (40), said boot (42) being flexible and axially extendable and contractible axially with movement of said core element (10).

2. An assembly as set forth in claim 1 wherein said wiper cap (26) includes a flange (36) extending annularly around said swivel ball (24), said first end (44) of said boot (42) being disposed about said flange (36).

3. An assembly as set forth in claim 2 wherein said wiper cap (26) is a one piece member comprising a conical nose (28) flaring outwardly from said core element (10) through a swivel pocket (32) surrounding said ball (24) and through a reverse turn (34) and into said flange (36) which terminates in a distal end.

4. An assembly as set forth in claim 3 including a projection (38) extending radially outwardly at said distal end of said flange (36), said first end (44) of said boot (42) defining a first band and a shoulder (48) with said band being disposed about said flange (36) and said shoulder (48) being hooked over said projection (38) to retain said first end (44) of said boot (42) on said wiper cap (26).

5. An assembly as set forth in claim 4 wherein said wiper-retainer (40) includes an annular recess (50) and said second end (46) of said boot (42) includes a second band disposed in said recess (50).

6. An assembly as set forth in claim 5 wherein said bands at the ends (44 and 46) of said boot (42) are radially elastic for disposition about and tight engagement with said wiper cap (26) and said wiper-retainer (40) respectively.

7. An assembly as set forth in claim 6 wherein said boot (42) includes corrugations (52) for said axial expansion and contraction.

8. An assembly as set forth in claim 7 wherein said boot (42) is made of a different material than said wiper cap (26).

9. An assembly as set forth in claim 8 wherein said conduit means comprises a flexible conduit (14) and at least one support fitting (16 or 18) disposed thereon for attachment to a structure, said swivel ball (24) being defined by said support fitting (16), and terminal means (20 and 22) disposed at the ends of said core element (10) for attachment to control members.

* * * * *